Patented Feb. 25, 1941

2,232,794

UNITED STATES PATENT OFFICE 2,232,794

STABILIZING OF CELLULOSE ESTERS

Mervin E. Martin, Cumberland, Md., assignor to Celanese Corporation of America, a corporation of Delaware No Drawing. Application February 28, 1939, Serial No. 258,886

13 Claims. (Cl. 260—230)

This invention relates to the preparation of organic esters of cellulose, and relates more particularly to the production of stabilized organic esters of cellulose.

An object of this invention is the economic and expeditious preparation of stabilized organic esters of cellulose.

Other objects of this invention will appear from the following detailed description and claims.

In its broadest aspect the present invention is concerned with a process of stabilizing organic esters of cellulose by dissolving unstabilized organic esters of cellulose in a lower aliphatic acid such as, for example, acetic acid, propionic acid and butyric acid, in the presence of a small amount of concentrated sulphuric acid, and then reprecipitating the ester.

In the process of preparing organic esters of cellulose, the esterification of cellulose is usually carried out by treating cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible.

The present invention may be employed in the making of any suitable organic ester of cellulose such as cellulose formate, cellulose acetate, cellulose propionate and cellulose butyrate. Cellulose in any suitable form, such as cotton, cotton linters, wood pulp made by either the sulphite or soda process, reconstituted cellulose, etc., may be employed in making the cellulose esters. The cellulose may be activated by pre-treatment with lower aliphatic acids or by treatment with alkali, etc. The esterifying agent may be formic acid, acetic anhydride, propionic anhydride or butyric anhydride depending upon the ester to be formed. The esterification may be carried out in the presence of a suitable catalyst such as sulphuric acid, sodium bisulphate, methyl sulphate or a mixture of these with each other or with other catalysts such as zinc chloride. However, for the sake of simplicity this invention will be described in connection with the preparation of cellulose acetate which is at the present time commercially the most important of the cellulose esters.

Thus, in preparing cellulose acetate by the prior process such as outlined above for the preparation of cellulose esters, cellulose is acetylated by treatment with acetic anhydride and a catalyst, such as sulphuric acid, in the presence of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose acetate may be washed with water to remove as much acid and other non-cellulose ester ingredients of the acetylation mixture as possible.

Prior to precipitation the cellulose acetate may be treated with basic salts such as basic aluminum acetate, sodium aluminate, sodium acetate or with mixtures of these with aluminum chloride, zinc chloride or hydrochloric acid. This treatment acts to remove sulphur compounds and other non-stable compounds. It is with a process wherein such basic salts are used that this invention is particularly concerned.

It has been found that by treating the precipitated cellulose acetate, made in accordance with a process wherein basic salts have been employed to remove the sulphur and other non-stable compounds, by dissolving the cellulose acetate in a suitable solvent containing a small amount of sulphuric acid, a cellulose acetate of greater stability is produced without any substantial alteration in the acetyl value or the acetone viscosity thereof.

In accordance with this invention, the cellulose acetate as it is precipitated, washed neutral and dried is dissolved in a solvent comprising acetic acid of high concentration and containing a small amount of concentrated sulphuric acid, the solution allowed to stand at a constant temperature for a suitable length of time and the cellulose acetate precipitated by the use of a large quantity of water or other suitable non-solvent. If acetic acid below 96% concentration is employed as the solvent, little or no improvement in the stability of the cellulose acetate is effected. The acetic acid should have a concentration of at least 96% and preferably 99.5% for the purposes of this invention. The sulphuric acid concentration should be 98%. For example, cellulose acetate precipitated from a solution in which a basic salt had been added to remove sulphur or other non-stable compounds may be stabilized by dissolving 80 parts of the same in 400 parts of acetic acid having a concentration of at least 96% containing 0.1 to 1.0 parts 98% sulphuric acid. The use of greater amounts of sulphuric acid causes the cellulose acetate to hydrolyze.

The product formed in accordance with this invention has substantially the same acetyl value and acetone viscosity of the cellulose acetate before treatment but its stability and heat tests are much greater. Thus, cellulose acetate prepared by the process of this invention is more stable to light and heat and has a higher heat test than the cellulose acetate before treatment. That is, it may be heated to a higher temperature before it begins to decompose or char.

In order to further illustrate this invention but without being limited thereto, the following specific example is given:

Cellulose acetate is formed by treating cellulose with a mixture of acetic anhydride, glacial acetic acid and a proportion of sulphuric acid as catalyst. After the acetylation, a viscous, homogeneous solution is formed and sufficient water is added thereto to precipitate the cellulose acetate. 80 grams of this precipitated cellulose acetate are dissolved in 400 ccs. of acetic acid of a concentration of 99.5% containing 0.2 cc. of 98% sulphuric acid. After this mixture is allowed to stand for 18 hours at 22° C. the cellulose acetate is precipitated by the addition of a large quantity of water and then washed and dried. The cellulose acetate thus purified has a heat test of 30 degrees higher than the cellulose acetate which had not been subjected to the treatment in accordance with this invention but which was merely washed and dried after precipitation from the solution of which it was formed, is more stable to light and heat and has an extremely low sulphur content. The acetone viscosity and the acetyl value of the cellulose acetate before and after treatment are substantially the same.

It is to be understood that the foregoing detailed description is given merely by way of illustration and that many variations may be made therein without departing from the spirit of my invention.

Having described my invention, what I desire to secure by Letters Patent is:

1. Process for stabilizing a cellulose ester of a lower aliphatic carboxylic acid, which comprises dissolving a ripened unstabilized cellulose ester of a lower aliphatic carboxylic acid in a solvent therefor containing an amount of concentrated sulphuric acid from 0.025 to 0.25% by volume based on the solvent, and then precipitating the ester from the solution.

2. Process for stabilizing cellulose acetate, which comprises dissolving ripened unstabilized cellulose acetate in a solvent therefor containing an amount of concentrated sulphuric acid from 0.025 to 0.25% by volume based on the solvent, and then precipitating the cellulose acetate from the solution.

3. Process for stabilizing a cellulose ester of a lower aliphatic carboxylic acid, which comprises dissolving a ripened unstabilized cellulose ester of a lower aliphatic carboxylic acid in a lower aliphatic acid of high concentration containing an amount of concentrated sulphuric acid from 0.025 to 0.25% by volume based on the aliphatic acid, and then precipitating the ester from the solution.

4. Process for stabilizing cellulose acetate, which comprises dissolving ripened unstabilized cellulose acetate in acetic acid of high concentration containing an amount of concentrated sulphuric acid from 0.025 to 0.25% by volume based on the acetic acid, and then precipitating the cellulose acetate from the solution.

5. Process for stabilizing a cellulose ester of a lower aliphatic carboxylic acid, which comprises dissolving a ripened unstabilized cellulose ester of a lower aliphatic carboxylic acid in a lower aliphatic acid of a concentration of at least 96% containing an amount of concentrated sulphuric acid from 0.025 to 0.25% by volume based on the aliphatic acid, and then precipitating the ester from the solution.

6. Process for stabilizing cellulose acetate, which comprises dissolving ripened unstabilized cellulose acetate in acetic acid of a concentration of at least 96% containing an amount of concentrated sulphuric acid from 0.025 to 0.25% by volume based on the acetic acid, and then precipitating the cellulose acetate from the solution.

7. Process for stabilizing cellulose acetate which comprises dissolving ripened unstabilized cellulose acetate in acetic acid of a concentration of at least 99.5% containing an amount of 98% sulphuric acid from 0.025 to 0.25% by volume based on the acetic acid, and then precipitating the cellulose acetate from the solution.

8. Process for stabilizing a cellulose ester of a lower aliphatic carboxylic acid that has been precipitated in the presence of a basic salt, which comprises dissolving the ripened unstabilized cellulose ester of a lower aliphatic carboxylic acid in a solvent therefor containing an amount of concentrated sulphuric acid from 0.025 to 0.25% by volume based on the solvent, and then precipitating the ester from the solution.

9. Process for stabilizing cellulose acetate that has been precipitated in the presence of a basic salt, which comprises dissolving the ripened unstabilized cellulose acetate in a solvent therefor containing an amount of concentrated sulphuric acid from 0.025 to 0.25% by volume based on the solvent, and then precipitating the cellulose acetate from the solution.

10. Process for stabilizing a cellulose ester of a lower aliphatic carboxylic acid that has been precipitated in the presence of a basic salt, which comprises dissolving the ripened unstabilized cellulose ester of a lower aliphatic carboxylic acid in a lower aliphatic acid of a concentration of at least 96% containing an amount of concentrated sulphuric acid from 0.025 to 0.25% by volume based on the aliphatic acid, and then precipitating the ester from the solution.

11. Process for stabilizing cellulose acetate that has been precipitated in the presence of a basic salt, which comprises dissolving the ripened unstabilized cellulose acetate in acetic acid of a concentration of at least 96% containing an amount of concentrated sulphuric acid from 0.025 to 0.25% by volume based on the acetic acid, and then precipitating the cellulose acetate from the solution.

12. Process for stabilizing cellulose acetate that has been precipitated in the presence of a basic salt, which comprises dissolving the ripened unstabilized cellulose acetate in acetic acid of a concentration of at least 96% containing an amount of concentrated sulphuric acid from 0.025 to 0.25% by volume based on the acetic acid, permitting the solution to stand for 18 hours at a low temperature, and then precipitating the cellulose acetate from the solution.

13. Process for stabilizing cellulose acetate that has been precipitated in the presence of a basic salt, which comprises dissolving the ripened stabilized cellulose acetate in acetic acid of a concentration of at least 99.5% containing an amount of 98% sulphuric acid from 0.025 to 0.25% by volume based on the acetic acid, permitting the solution to stand for 18 hours at a temperature of 22° C., and then precipitating the cellulose acetate from the solution.

MERVIN E. MARTIN.